US008103645B1

United States Patent
Sobel et al.

(10) Patent No.: US 8,103,645 B1
(45) Date of Patent: Jan. 24, 2012

(54) AUTOMATIC LOCAL DEPLOYMENT OF SITE ASSOCIATED CUES FOR ANTIPHISHING PURPOSES

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1975 days.

(21) Appl. No.: 11/049,478

(22) Filed: Feb. 2, 2005

(51) Int. Cl.
*G06F 7/00* (2006.01)
*G06F 17/00* (2006.01)

(52) U.S. Cl. .......................... 707/705; 707/758
(58) Field of Classification Search .................. None
See application file for complete search history.

(56) References Cited

U.S. PATENT DOCUMENTS

| | | | |
|---|---|---|---|
| 7,100,049 B2 * | 8/2006 | Gasparini et al. .......... | 713/170 |
| 2002/0078102 A1 * | 6/2002 | Dutta ...................... | 707/526 |
| 2002/0199018 A1 * | 12/2002 | Diedrich et al. ........... | 709/245 |
| 2006/0053293 A1 * | 3/2006 | Zager et al. ............... | 713/176 |

OTHER PUBLICATIONS

Dyck, Timothy, Review: Teros-100 APS 2.1.1, [Online] May 28, 2003, [Retrieved from the Internet on Oct. 6, 2004] Retrieved from the Internet: <URL: http://www.eweek.com/article2/0,1759, 1110435,00.asp>, Woburn, MA, U.S.A.
Dyck, Timothy, Review: Teros-100 APS 2.1.1, [Online] May 28, 2003, [Retrieved from the Internet on Oct. 6, 2004] Retrieved from the Internet: <URL: http://www.eweek.com/article2/0,1759, 1110435,00.asp>.

* cited by examiner

*Primary Examiner* — Jay Morrison
(74) *Attorney, Agent, or Firm* — Fenwick & West LLP

(57) ABSTRACT

Computer-implemented methods, apparatus, and computer-readable media for recognizing legitimate websites. An embodiment of the inventive method comprises the steps of storing (200) a plurality of network addresses, associating (210) a unique cue with each of the plurality of network addresses, determining (220) whether a user launches a URL, and when it is determined that the user launches the URL, determining (230) whether the URL matches one of the plurality of network addresses, and when it is determined that the URL matches one of the plurality of network addresses, retrieving (240) the cue associated with the one of the plurality of network addresses and deploying (250) the associated cue.

30 Claims, 2 Drawing Sheets

AUTOMATIC LOCAL DEPLOYMENT OF SITE ASSOCIATED CUES FOR ANTIPHISHING PURPOSES

TECHNICAL FIELD

This invention pertains to the field of preventing phishing scams that plague personal and other computers, and, in particular, to the deployment of site-associated cues for antiphishing purposes.

BACKGROUND ART

Phishing scams have been an immense and growing problem, and they continue to grow in frequency and sophistication. In a phishing scam, a phisher sends a legitimate-looking email that appears to originate from a targeted website, e.g., a financial institution, a shopping site, or an internet Service Provider. The phisher sends the fraudulent email in an attempt to convince the recipient to enter personal or financial information, e.g., a credit card number, a bank account number, a password, or a pin number.

PassMark Security, Inc. provides an antiphishing system where back-end systems at the targeted sites allow their users to associate a personal picture with the site's password form. When the user enters his or her username at the targeted site, the site displays a password form that includes a personal picture that was supplied by the user for association with the site. Thus, the user expects a particular personal picture with a request for a password at a particular site. If the user does not see the personal picture with the request for a password, the user knows not to provide the password. PassMark's system allows the user to easily recognize a phishing scam.

One major drawback to this antiphishing system is that a phisher can proxy requests to the targeted site, thereby obtaining the personal picture associated with a given username. Thus, in some cases, the targeted site is vulnerable to a spoofing attack where a "man-in-the-middle" can obtain the user's picture and replay an attack to steal the user's information. PassMark's system also requires the targeted site to implement its technology. If the targeted site does not implement PassMark's technology, the user of the site does not benefit from the antiphishing system. Accordingly, there is a need for a mechanism that can be easily implemented and that allows a user to easily discriminate between legitimate and spoofed versions of a targeted website.

DISCLOSURE OF INVENTION

In accordance with methods and systems consistent with the present invention, computer-implemented methods, apparatus, and computer-readable media are provided for recognizing legitimate websites. An embodiment of the inventive method comprises the steps of storing (200) a plurality of network addresses, associating (210) a unique cue with each of the plurality of network addresses, determining (220) whether a user launches a URL, and when it is determined that the user launches the URL, determining (230) whether the URL matches one of the plurality of network addresses, and when it is determined that the URL matches one of the plurality of network addresses, retrieving (240) the cue associated with the one of the plurality of network addresses and deploying (250) the associated cue.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Methods, apparatus, and articles of manufacture consistent with the present invention overcome the shortcomings of the prior art by deploying a site-associated cue locally on a user's machine. Using methods and systems consistent with the present invention, the user maintains a list of legitimate sites, and the user need not rely on the targeted site to protect the user from a phishing scam. By performing its tasks locally, methods and systems consistent with the present invention are not vulnerable to network-based proxy attacks. Because none of the cues used by the user for identifying targeted sites is transmitted over any network connections, the cues are not vulnerable to sniffing or Domain Name System ("DNS") spoofing.

Figure 1:
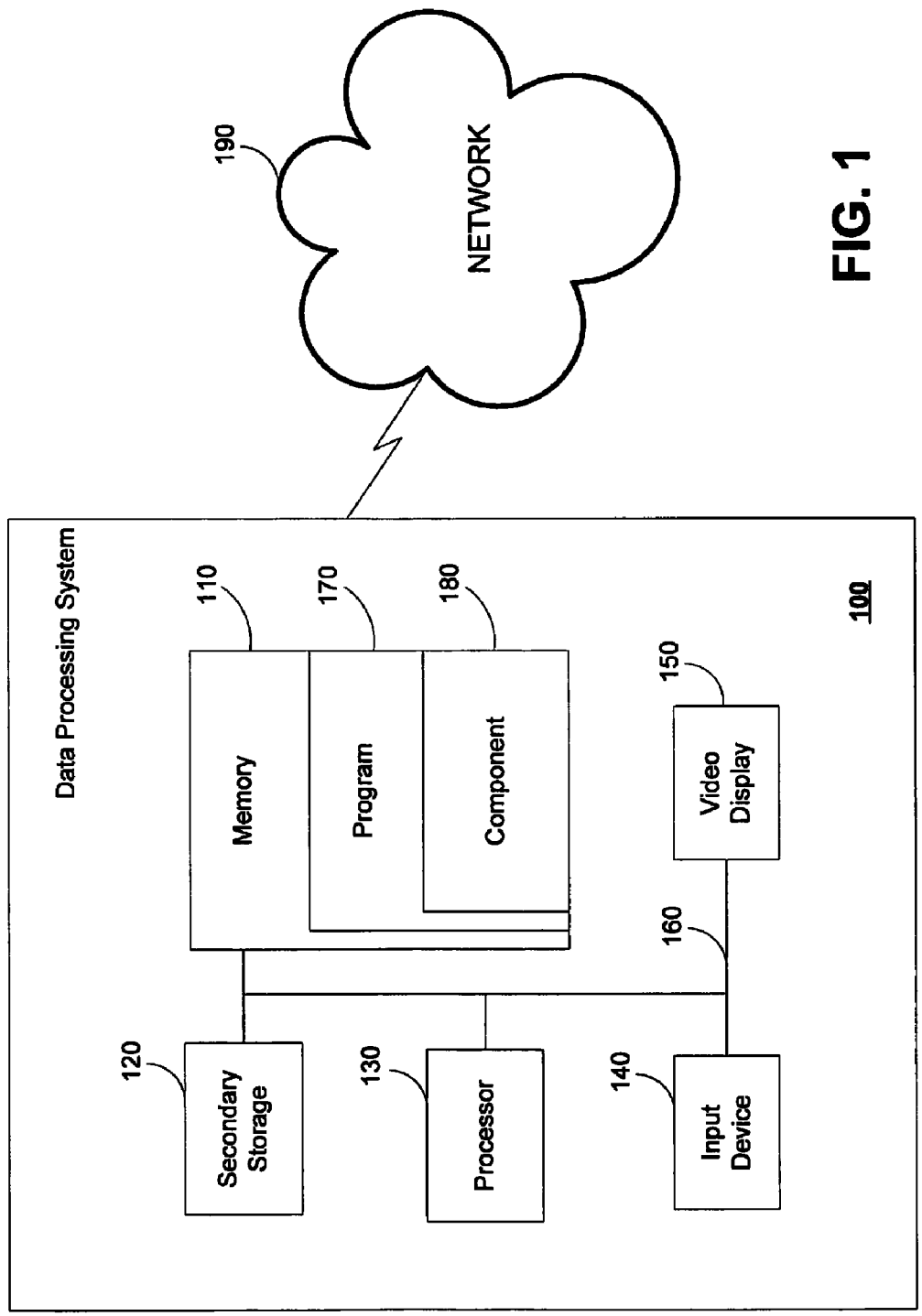
FIG. 1 depicts a data processing system suitable for implementing an embodiment of the present invention.

FIG. 1 depicts an exemplary data processing system 100 suitable for practicing methods and systems consistent with the present invention. Data processing system 100 is connected to a network 190, such as a Local Area Network, Wide Area Network, or the internet.

Data processing system 100 contains a main memory 110, a secondary storage device 120, a processor 130, an input device 140, and a video display 150. These internal components exchange information with one another via a system bus 160. These components are standard in most computer systems suitable for use with practicing methods and configuring systems consistent with the present invention.

Memory 110 includes a program 170 having a component 180. One having skill in the art will appreciate that program 170 can reside in a memory on a system other than data processing system 100. Program 170 may comprise or may be included in one or more code sections containing instructions for performing their respective operations. While program 170 is described as being implemented as software, the present invention may be implemented as any combination of hardware, firmware, and software.

Although not shown in FIG. 1, like all data processing systems, data processing system 100 has an operating system that controls its operations, including the execution of program 170 by processor 130. Also, although aspects of one implementation consistent with the principles of the present invention are described herein with program 170 stored in main memory 110, one skilled in the art will appreciate that all or part of methods and systems consistent with the present invention may be stored on or read from other computer-readable media, such as secondary storage devices 120, e.g., hard disks, floppy disks, and CD-ROM; a carrier wave received from a network such as the internet; or other forms of ROM or RAM, either currently known or later developed. Finally, although specific components of data processing system 100 have been described, one skilled in the art will appreciate that a data processing system suitable for use with methods and systems consistent with the present invention may contain additional or different components.

Component 180 includes a list of network addresses. The user may add a network address to the list either by manually typing the network address into the list, or by pressing a toolbar button integrated into a browser when the user visits the site the user wishes to add. A default list of network addresses also may be pre-installed with component 180.

This default list includes network addresses that are the most likely targets of phishing scams, for example, those of leading financial institutions.

A user associates each of the network addresses in the list with a specific cue. These cues may include audio signals, visual signals, or both. A cue may consist of a picture, an animation, a sound, a dialog, or a change in the appearance of a user interface such as a toolbar indicator. The cue also may launch a particular application program selected by the user.

The user may use the same cue for all of the sites on its list, or the user may select a specific set of cues for each site. Alternatively, the user may select a set of cues for specific sites, while using another set of cues for sites in the default list of phishing target sites. Each of the cues may be implemented separately or in combination. For example, for a given site, the user could implement a cue that flashes the picture of the user's dog three times while playing a barking sound.

Methods and systems consistent with the present invention provide many options regarding how to implement the cues. One option is to implement a browser plug-in or active protocol filter such as those in the Norton Internet Security ("NIS") and other personal firewall products, e.g., those used for ad blocking or script blocking. Thus, an NIS protocol filter or a browser plug-in may activate a sound or animation when the user launches a given network address. As another option, a protocol filter may alter the HTML of associated sites to include the cues, e.g., a picture could be included as the background of the web page, or inserted at the top or bottom of the web page. Rather than modifying the HTML, a toolbar button on the browser may change its appearance, display a picture, play a sound, play an animation, or pop-up a dialog, another window or user interface element. The targeted site may be given the option to indicate where it prefers the visual cues to be inserted on its page through the use of HTML comments, custom tags, style sheet entries, etc.

Figure 2:
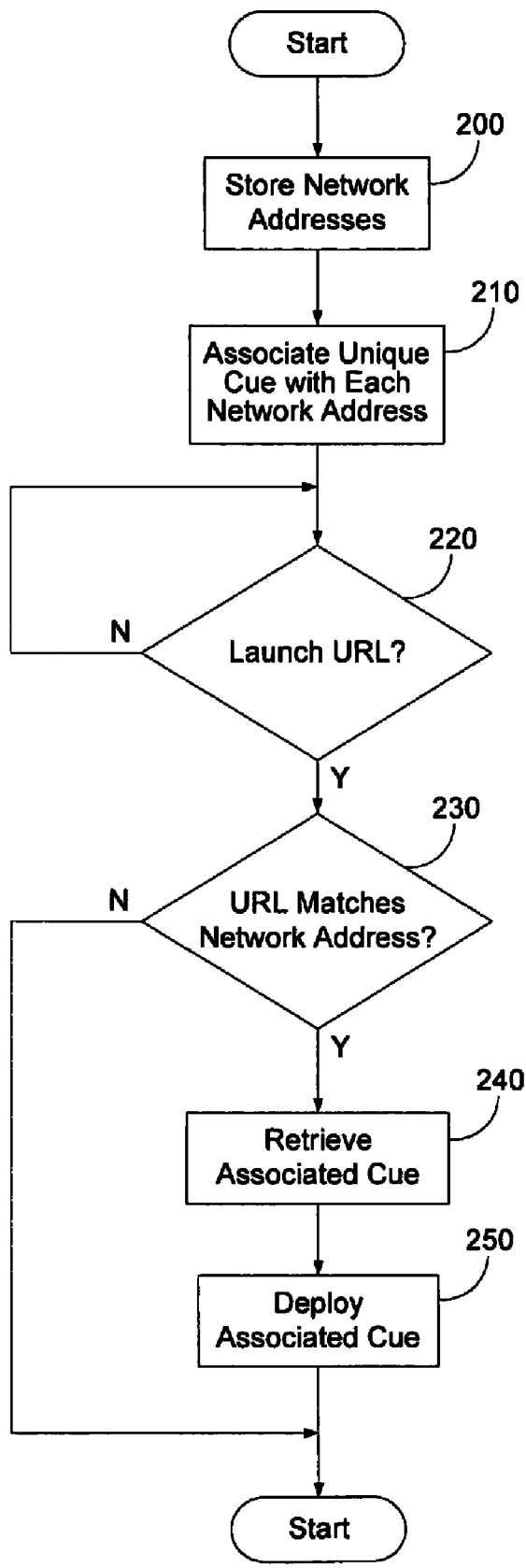
FIG. 2 is a flow diagram illustrating an embodiment of the present invention.

FIG. 2 depicts a flow chart illustrating the steps performed by component 180 in one embodiment to recognize legitimate websites. Component 180 initially stores a list of network addresses (step 200). As discussed above, this list initially may be supplied with component 180. This list also may be added or modified by the user. Component 180 then associates a unique cue with each network address (step 210). Component 180 waits for the user to launch a Uniform Resource Locator ("URL") (step 220). After the user launches a URL, component 180 determines whether the URL matches one of the network addresses in the list (step 230). If component 180 determines that the URL matches one of the network addresses, component 180 retrieves the cue associated with the network address (step 240), and deploys the associated cue (step 250). Thus, if the associated cue for the user's bank is a picture of the user's children, upon determining that the user entered the correct address for the user's bank, component 180 retrieves the stored picture and displays it on the user's computer screen as part of the web page for the user's bank. Upon seeing the picture of his or her children, the user can then confidently enter his or her password knowing that he or she is at the correct site. If component 180 determines that the URL does not match any of the network addresses, component 180 does not launch any cues.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for recognizing legitimate websites, comprising the steps of:
    using a computer to perform steps comprising:
        storing a plurality of network addresses;
        associating a unique cue with each of the plurality of network addresses;
        determining whether a user launches a URL; and
        when it is determined that the user launches the URL,
            determining whether the URL matches one of the plurality of network addresses; and
            when it is determined that the URL matches one of the plurality of network addresses,
                retrieving the unique cue associated with the one of the plurality of network addresses; and
                deploying the associated unique cue.

2. The method of claim 1, wherein at least one of the plurality of cues comprises an audio signal.

3. The method of claim 1, wherein at least one of the plurality of cues comprises a visual signal.

4. The method of claim 1, wherein at least one of the plurality of cues comprises an animation.

5. The method of claim 1, wherein at least one of the plurality of cues comprises a toolbar indicator.

6. The method of claim 1, wherein at least one of the plurality of cues comprises a pop-up dialog.

7. The method of claim 1, wherein at least one of the plurality of cues comprises a selected application program.

8. The method of claim 1, further comprising the steps of:
    receiving an indication of a new network address;
    storing the new network address with the plurality of network addresses;
    receiving an indication of a new unique cue; and
    associating the new unique cue with the new network address.

9. A non-transitory computer-readable medium containing executable computer program instructions for recognizing legitimate websites, the computer program instructions performing the steps of:
    storing a plurality of network addresses;
    associating a unique cue with each of the plurality of network addresses;
    determining whether a user launches a URL; and
    when it is determined that the user launches the URL,
        determining whether the URL matches one of the plurality of network addresses; and
        when it is determined that the URL matches one of the plurality of network addresses,
            retrieving the unique cue associated with the one of the plurality of network addresses; and
            deploying the associated unique cue.

10. The computer-readable medium of claim 9, wherein at least one of the plurality of cues comprises an audio signal.

11. The computer-readable medium of claim 9, wherein at least one of the plurality of cues comprises a visual signal.

12. The computer-readable medium of claim 9, wherein at least one of the plurality of cues comprises an animation.

13. The computer-readable medium of claim 9, wherein at least one of the plurality of cues comprises a toolbar indicator.

14. The computer-readable medium of claim 9, wherein at least one of the plurality of cues comprises a pop-up dialog.

15. The computer-readable medium of claim 9, wherein at least one of the plurality of cues comprises a selected application program.

16. The computer-readable medium of claim 9, further comprising computer program instructions for performing the steps of:

receiving an indication of a new network address;

storing the new network address with the plurality of network addresses;

receiving an indication of a new unique cue; and associating the new unique cue with the new network address.

17. A data processing apparatus comprising:

a non-transitory memory device comprising an executable program that stores a plurality of network addresses, associates a unique cue with each of the plurality of network addresses, determines whether a URL launched by a user matches one of the plurality of network addresses, and when it is determined that the URL matches one of the plurality of network addresses, the program retrieves the unique cue associated with the one of the plurality of network addresses and deploys the associated unique cue; and coupled to the memory device, a processor for executable the program.

18. The data processing apparatus of claim 17, wherein at least one of the plurality of cues comprises an audio signal.

19. The data processing apparatus of claim 17, wherein at least one of the plurality of cues comprises a visual signal.

20. The data processing apparatus of claim 17, wherein at least one of the plurality of cues comprises an animation.

21. The data processing apparatus of claim 17, wherein at least one of the plurality of cues comprises a toolbar indicator.

22. The data processing apparatus of claim 17, wherein at least one of the plurality of cues comprises a pop-up dialog.

23. The data processing apparatus of claim 17, wherein at least one of the plurality of cues comprises a selected application program.

24. The data processing apparatus of claim 17, wherein the program further receives an indication of a new network address, stores the new network address with the plurality of network addresses, receives an indication of a new unique cue, and associates the new unique cue with the new network address.

25. The method of claim 1, wherein the plurality of cues and the plurality of network addresses are stored on a machine on which the user launches the URL.

26. The method of claim 1, wherein the unique cue associated with the one of the plurality of network addresses is retrieved from a machine on which the user launches the URL.

27. The computer-readable medium of claim 9, wherein the plurality of cues and the plurality of network addresses are stored on a machine on which the user launches the URL.

28. The computer-readable medium of claim 9, wherein the unique cue associated with the one of the plurality of network addresses is retrieved from a machine on which the user launches the URL.

29. The data processing apparatus of claim 17, wherein the plurality of cues and the plurality of network addresses are stored on a machine on which the user launches the URL.

30. The data processing apparatus of claim 17, wherein the unique cue associated with the one of the plurality of network addresses is retrieved from a machine on which the user launches the URL.

* * * * *